(12) United States Patent
Cranor et al.

(10) Patent No.: US 7,165,100 B2
(45) Date of Patent: Jan. 16, 2007

(54) METHOD AND APPARATUS FOR PACKET ANALYSIS IN A NETWORK

(75) Inventors: Charles D. Cranor, Morristown, NJ (US); Theodore Johnson, New York, NY (US); Oliver Spatscheck, Randolph, NJ (US); Divesh Srivastava, Summit, NJ (US)

(73) Assignee: AT&T Corp., New York, NY (US)

( * ) Notice: Subject to any disclaimer, the term of this patent is extended or adjusted under 35 U.S.C. 154(b) by 745 days.

(21) Appl. No.: 09/911,989

(22) Filed: Jul. 24, 2001

(65) Prior Publication Data
US 2003/0055950 A1    Mar. 20, 2003

(51) Int. Cl.
*G06F 15/173*    (2006.01)

(52) U.S. Cl. .................. 709/223; 709/227; 709/250

(58) Field of Classification Search .......... 709/223, 709/224, 225, 226, 232, 236, 250, 227, 253, 709/213, 230
See application file for complete search history.

(56) References Cited

U.S. PATENT DOCUMENTS

| 5,787,253 | A | * | 7/1998 | McCreery et al. .......... 709/231 |
| 5,875,176 | A | | 2/1999 | Sherer et al. |
| 6,009,528 | A | * | 12/1999 | Teraoka ...................... 713/201 |
| 6,044,401 | A | | 3/2000 | Harvey |
| 6,115,776 | A | | 9/2000 | Reid et al. |
| 6,154,775 | A | * | 11/2000 | Coss et al. ................... 709/225 |
| 6,170,012 | B1 | * | 1/2001 | Coss et al. ................... 709/225 |
| 6,356,951 | B1 | * | 3/2002 | Gentry, Jr. ................... 709/250 |
| 6,367,034 | B1 | | 4/2002 | Novik et al. |
| 6,389,468 | B1 | * | 5/2002 | Muller et al. ............... 709/226 |
| 6,457,051 | B1 | * | 9/2002 | Riddle et al. ............... 709/224 |
| 6,498,782 | B1 | * | 12/2002 | Branstad et al. ............ 370/231 |
| 6,708,292 | B1 | * | 3/2004 | Mangasarian ................ 714/39 |
| 6,735,629 | B1 | | 5/2004 | Cafarelli, et al. |
| 6,748,431 | B1 | * | 6/2004 | Fleig et al. .................. 709/224 |
| 2002/0026502 | A1 | | 2/2002 | Phillips et al. |
| 2003/0051026 | A1 | | 3/2003 | Carter et al. |

OTHER PUBLICATIONS

Gigabit Ethernet Network Interface Card, 3Com Corp.
Cisco Gigabit Ethernet SwitchProbe Configuration Note, Cisco Systems Inc.
Narus Virtual Analyzers, Narus Inc.

* cited by examiner

*Primary Examiner*—Ario Etienne
*Assistant Examiner*—LaShonda Jacobs

(57) ABSTRACT

A method and system for monitoring traffic in a data communication network and for extracting useful statistics and information is disclosed. In accordance with an embodiment of the invention, a network interface card has a run-time system and one or more processing blocks executing on the network interface. The run-time system module feeds information derived from a network packet to the processing modules which process the information and generate output such as condensed statistics about the packets traveling through the network.

22 Claims, 25 Drawing Sheets

```
301  DEFINE {
302  fta_name 'count_pkts';
303  }
304
305  select timestamp, hdr_length
306  from IPV4 p
307  where hdr_length > 50
```

FIG. 5A

```
501  #include "rts.h"
502  #include "fta.h"
503
504
505
506  /*        The FTA references the following internal fcns:
507  */
508
509  struct count_pkts_fta{
510          struct FTA f;
511  } ;
512
513  struct count_pkts_tuple{
514          struct timeval  tuple_var0;
515          unsigned int   tuple_var1;
516  } ;
517
518  static int free_fta(struct FTA *f) {
519          return 0;
520  }
521
522  static int control_fta(struct FTA *f,  int command, int sz, void *value) {
523          struct count_pkts_fta * t = (struct count_pkts_fta *) f;
524
525          return 0;
526  }
527
528  static int accept_packet(struct FTA *f, struct packet *p) {
529  /*        Variables which are always needed    */
530          int retval, tuple_size, tuple_pos;
531          struct count_pkts_tuple *tuple;
532          struct count_pkts_fta *t = (struct count_pkts_fta*) f;
533
534  /*        Variables for unpacking attributes    */
535          unsigned int  unpack_var_hdr_length_3;
536          struct timeval  unpack_var_timestamp_3;
537
538
```

FIG. 5a (continued)

```
539  /*          Unpack the referenced fields    */
540      retval = get_ipv4_hdr_length(p,  &unpack_var_hdr_length_3);
541      if(retval) return 0;
542      retval = get_timestamp(p,  &unpack_var_timestamp_3);
543      if(retval) return 0;
544
545
546  /*          Test the predicate    */
547      if( !( ( unpack_var_hdr_length_3>50 ) ) )
548          return 0;
549
550  /*          Create and post the tuple    */
551      tuple_size = sizeof( struct count_pkts_tuple);
552      tuple = allocate_tuple(f,t->f.stream_id, tuple_size );
553      if( tuple == NULL)
554          return 0;
555      tuple_pos = sizeof( struct count_pkts_tuple);
556      tuple->tuple_var0 = unpack_var_timestamp_3;
557      tuple->tuple_var1 = unpack_var_hdr_length_3;
558      post_tuple(tuple);
559
560  return 0;
561  }
```

FIG. 5B

```
562  struct FTA * count_pkts_fta_alloc(unsigned stream_id, unsigned priority, int
563  argvc, void * argv[] ) {
564          struct count_pkts_fta* f;
565
566          if( (f=fta_alloc(0,sizeof(struct count_pkts_fta) ) )==0) {
567                  return(0);
568          }
569
570          f->f.stream_id=stream_id;
571          f->f.priority=priority;
572          f->f.alloc_fta=count_pkts_fta_alloc;
573          f->f.free_fta=free_fta;
574          f->f.control_fta=control_fta;
575          f->f.accept_packet=accept_packet;
576
577          return (struct FTA *) f;
578  }
```

FIG. 6

```
601  DEFINE {
602  fta_name 'count_pkts';
603  aggregate_slots '1';
604  }
605
606  select timebucket, count(*)
607  from IPV4 p
608  group by timestamp/5000 AS timebucket
```

FIG. 8A

```
801  #include "rts.h"
802  #include "fta.h"
803
804
805
806  /*       The FTA references the following internal fcns:
807         Divide_Timeval_Int
808  */
809
810  static struct timeval Divide_Timeval_Int(struct timeval t, int d) {
811         struct timeval r;
812         r.tv_sec = t.tv_sec / d;
813         r.tv_usec = ( t.tv_usec + 1000* (t.tv_sec % d )) / d;
814         return(r);
815  }
816
817
818
819  struct count_pkts_aggr_struct {
820         struct timeval  gb_var0;
821         unsigned int    aggr_var0;
822         struct count_pkts_aggr_struct *next;
823  } ;
824
825  struct count_pkts_fta {
826         struct FTA f;
827         struct count_pkts_aggr_struct *aggr_head;
828         int n_aggrs;
829         int max_aggrs;
830         struct timeval   last_gb_0;
831  } ;
832
833  struct count_pkts_tuple {
834         struct timeval   tuple_var0;
835         unsigned int    tuple_var1;
836  } ;
837
```

FIG. 8A (continued)

```
838  static void fta_aggr_flush(struct FTA *f) {
839       struct count_pkts_aggr_struct *curr_aggr, *next_aggr;
840       int tuple_size;
841       struct count_pkts_tuple *tuple;
842       struct count_pkts_fta * t = (struct count_pkts_fta *) f;
843
844       curr_aggr = t->aggr_head;
845       while(curr_aggr != NULL) {
846            next_aggr = curr_aggr->next;
847  /*        Create an output tuple for the aggregate being kicked out   */
848                 tuple_size = sizeof( struct count_pkts_tuple);
849                 tuple = allocate_tuple(f,t->f.stream_id, tuple_size );
850                 if( tuple != NULL) {
851                      tuple_pos = sizeof( struct count_pkts_tuple);
852                      tuple->tuple_var0 = curr_aggr->gb_var0;
853                      tuple->tuple_var1 = curr_aggr->aggr_var0;
854                      post_tuple(tuple);
855                 }
856            fta_free(f,curr_aggr);
857            curr_aggr = next_aggr;
858       }
859       t->n_aggrs = 0;
860       t->aggr_head = NULL;
861  }
```

FIG. 8B

```
801  static int free_fta(struct FTA *f) {
802          fta_aggr_flush( );
803          return 0;
804  }
805
806  static int control_fta(struct FTA *f, int command, int sz, void *value) {
807          struct count_pkts_fta * t = (struct count_pkts_fta *) f;
808
809          if(command == FTA_COMMAND_FLUSH)
810                  fta_aggr_flush( );
811          return 0;
812  }
813
814  static int accept_packet(struct FTA *f, struct packet *p) {
815  /*          Variables which are always needed    */
816          int retval, tuple_size, tuple_pos;
817          struct count_pkts_tuple *tuple;
818          struct count_pkts_fta *t = (struct count_pkts_fta*) f;
819
820  /*          Variables for unpacking attributes   */
821          struct timeval   unpack_var_timestamp_3;
822
823
824
825  /*          Variables for aggregation            */
826  /*          Group-by attributes       */
827          struct timeval   gb_attr_0;
828
829  /*          Variables for manipulating the aggregate list    */
830          struct count_pkts_aggr_struct *curr_aggr, *prev_aggr;
831
832  /*          Unpack the referenced fields    */
833          retval = get_timestamp(p, &unpack_var_timestamp_3);
834          if(retval) return 0;
835
836
837  /*          (no predicate to test)    */
838
```

FIG. 8B (continued)

```
839  /*      Search for an aggregate that matches on the group by attributes   */
840          gb_attr_0 = Divide_Timeval_Int (unpack_var_timestamp_3, 5000);
841
842  /*              Flush the aggregates if the temporal gb attrs have changed. */
843          if( !( (Compare_Timeval (t->last_gb_0, gb_attr_0) == 0) ) )
844                  fta_aggr_flush( );
845
846          curr_aggr = t->aggr_head; prev_aggr = NULL;
847          while(curr_aggr != NULL) {
848                  if( (Compare_Timeval (gb_attr_0, curr_aggr->gb_var0) == 0) )
849                          break;
850                  if(curr_aggr->next != NULL)
851                          prev_aggr = curr_aggr;
852                  curr_aggr = curr_aggr->next;
853          }
854
```

FIG. 8C

```
801        if(curr_aggr != NULL) {
802 /*          Match found : update in place, move to front.    */
803            curr_aggr->aggr_var0++;
804
805            if(prev_aggr != NULL)
806                    prev_aggr->next = curr_aggr->next;
807            if(t->aggr_head != curr_aggr)
808                    curr_aggr->next = t->aggr_head;
809            t->aggr_head = curr_aggr;
810        }else{
811 /*          No match found ...    */
812            if(t->n_aggrs == t->max_aggrs) {
813 /*          And the aggregate list is full.  Reclaim from the end.    */
814                    if(prev_aggr != NULL)
815                            curr_aggr = prev_aggr->next;
816                    else    curr_aggr = t->aggr_head;
817                    if(prev_aggr != NULL)
818                            prev_aggr->next = curr_aggr->next;
819                    if(t->aggr_head != curr_aggr) curr_aggr->next = t->aggr_head;
820                    t->aggr_head = curr_aggr;
821
822
823 /*          Create an output tuple for the aggregate being kicked out    */
824                    tuple_size = sizeof( struct count_pkts_tuple);
825                    tuple = allocate_tuple(f,t->f.stream_id, tuple_size );
826                    if( tuple != NULL) {
827                            tuple_pos = sizeof( struct count_pkts_tuple);
828                            tuple->tuple_var0 = curr_aggr->gb_var0;
829                            tuple->tuple_var1 = curr_aggr->aggr_var0;
830                            post_tuple(tuple);
831                    }
832            }else{
```

FIG. 8C (continued)

```
833  /*         Room in the aggregate list, add another block.    */
834                  curr_aggr = (struct count_pkts_aggr_struct *)
835  fta_alloc(f,sizeof(struct count_pkts_aggr_struct) );
836                  if(curr_aggr == NULL) return 0;
837                  curr_aggr->next = t->aggr_head;
838                  t->aggr_head = curr_aggr;
839                  t->n_aggrs++;
840          }
841
842          curr_aggr->gb_var0 = gb_attr_0;
843          curr_aggr->aggr_var0 = 1;
844      }
845
846      return 0;
847  }
```

FIG. 9

```
901  DEFINE {
902  fta_name 'count_pkts';
903  }
904
905  select timestamp, hdr_length, count(*),
906         sum(offset), max(ttl), min(destIP)
907  from IPV4 p
908  where ttl in [ 2, 3, 6, 9 ] and
909        timestamp > (TIMEVAL '123.45') + 5
910  group by timestamp, hdr_length
911
```

FIG. 11A

```
1101  #include "rts.h"
1102  #include "fta.h"
1103
1104
1105
1106  /*        The FTA references the following internal fcns:
1107        Add_Timeval_Int
1108        Compare_Timeval
1109        Subtract_Timeval_Timeval
1110        Timeval_Constructor
1111  */
1112
1113  static struct timeval Add_Timeval_Int(struct timeval t, int inc) {
1114        struct timeval r;
1115        r.tv_usec = t.tv_usec + (inc % 1000);
1116        r.tv_sec = t.tv_sec + inc / 1000;
1117        if(r.tv_usec > 999) {
1118              r.tv_usec -= 1000;
1119              r.tv_sec++;
1120        }
1121  }
1122
1123  static int Compare_Timeval (struct timeval t1, struct timeval t2) {
1124        return( t1.tv_sec != t2.tv_sec ? t1.tv_sec - t2.tv_sec : t1.tv_usec -
1125  t2.tv_usec );
1126  }
1127
1128  static int Subtract_Timeval_Timeval (struct timeval t1, struct timeval t2) {
1129        return(1000* (t1.tv_sec - t2.tv_sec) + (t1.tv_usec - t2.tv_usec) );
1130  }
1131
1132  static struct timeval Timeval_Constructor(int s, int m) {
1133        struct timeval r;
1134        r.tv_sec = s;
1135        r.tv_usec = m;
1136        return(r);
1137  }
1138
```

FIG. 11A (continued)

```
1139  struct count_pkts_aggr_struct {
1140      struct timeval gb_var0;
1141      unsigned int   gb_var1;
1142      unsigned int   aggr_var0;
1143      unsigned int   aggr_var1;
1144      unsigned int   aggr_var2;
1145      unsigned int   aggr_var3;
1146  } ;
1147
1148  struct count_pkts_fta {
1149      struct FTA f;
1150      struct count_pkts_aggr_struct *aggr_head;
1151      int n_aggrs;
1152      int max_aggrs;
1153  } ;
1154
1155  struct count_pkts_tuple {
1156      struct timeval tuple_var0;
1157      unsigned int   tuple_var1;
1158      unsigned int   tuple_var2;
1159      unsigned int   tuple_var3;
1160      unsigned int   tuple_var4;
1161      unsigned int   tuple_var5;
1162  } ;
```

FIG. 11B

```
1101  static int free_fta(struct FTA *f) {
1102      struct count_pkts_aggr_struct *curr_nd, *next_nd;
1103      curr_nd = f->aggr_head;
1104      while(curr_nd != NULL) {
1105          next_nd = curr_nd->next;
1106          fta_free(f, curr_nd);
1107          curr_nd = next_nd;
1108      }
1109      return 0;
1110  }
1111
1112  static int control_fta(struct FTA *f, int command, int sz, void *value) {
1113      struct count_pkts_fta * t = (struct count_pkts_fta *) f;
1114      return 0;
1115  }
1116
1117  static int accept_packet(struct FTA *f, struct packet *p) {
1118  /*        Variables which are always needed    */
1119      int retval, tuple_size, tuple_pos;
1120      struct count_pkts_tuple *tuple;
1121      struct count_pkts_fta *t = (struct count_pkts_fta*) f;
1122
1123  /*        Variables for unpacking attributes   */
1124      unsigned int    unpack_var_destIP_3;
1125      unsigned int    unpack_var_hdr_length_3;
1126      unsigned int    unpack_var_offset_3;
1127      struct timeval  unpack_var_timestamp_3;
1128      unsigned int    unpack_var_ttl_3;
1129
1130  /*        Variables for aggregation     */
1131  /*        Group-by attributes   */
1132      struct timeval gb_attr_0;
1133      unsigned int gb_attr_1;
1134
1135  /*        Variables for manipulating the aggregate list   */
1136      struct count_pkts_aggr_struct *curr_aggr, *prev_aggr;
1137
```

FIG. 11B (continued)

```
1138  /*           Unpack the referenced fields    */
1139       retval = get_ipv4_dest_ip(p, &unpack_var_destIP_3);
1140       if(retval) return 0;
1141       retval = get_ipv4_hdr_length(p, &unpack_var_hdr_length_3);
1142       if(retval) return 0;
1143       retval = get_ipv4_offset(p, &unpack_var_offset_3);
1144       if(retval) return 0;
1145       retval = get_timestamp(p, &unpack_var_timestamp_3);
1146       if(retval) return 0;
1147       retval = get_ipv4_ttl(p, &unpack_var_ttl_3);
1148       if(retval) return 0;
1149
1150  /*           Test predicate          */
1151       if( !( ( ( ( ( unpack_var_ttl_3 == 2 ) || ( unpack_var_ttl_3 == 3 ) ||
1152  ( unpack_var_ttl_3 == 6 ) || ( unpack_var_ttl_3 == 9 ) ) ) &&
1153  ( Compare_Timeval(unpack_var_timestamp_3, Add_Timeval_Int(Timeval_Constructor(123,
1154  450), 5) ) >0 ) ) ) )
1155       return 0:
1156
```

FIG. 11C

```
1101  /*     Search for an aggregate that matches on the group by attributes    */
1102         gb_attr_0 = unpack_var_timestamp_3;
1103         gb_attr_1 = unpack_var_hdr_length_3;
1104         curr_aggr = t->aggr_head; prev_aggr = NULL;
1105         while(curr_aggr != NULL) {
1106             if( (Compare_Timeval(gb_attr_0, curr_aggr->gb_var0) == 0) &&
1107  (gb_attr_1 == curr_aggr->gb_var_1) )
1108                     break;
1109             if(curr_aggr->next != NULL)
1110                     prev_aggr = curr_aggr;
1111             curr_aggr = curr_aggr->next;
1112         }
1113
1114         if(curr_aggr != NULL) {
1115  /*        Match found : update in place, move to front.      */
1116             curr_aggr->aggr_var0++;
1117             curr_aggr->aggr_var1 += unpack_var_offset_3;
1118             curr_aggr->aggr_var2 = ( curr_agg->aggr_var2 >= unpack_var_ttl_3 ?
1119  curr_aggr->aggr_var2 : unpack_var_ttl_3 );
1120             curr_aggr->aggr_var3 = ( curr_agg->aggr_var3 <=
1121  unpack_var_destIP_3 ? curr_aggr->aggr_var3 : unpack_var_destIP_3 );
1122             if(prev_aggr != NULL)
1123                     prev_aggr->next = curr_aggr->next;
1124             if(t->aggr_head != curr_aggr)
1125                     curr_aggr->next = t->aggr_head;
1126             t->aggr_head = curr_aggr;
1127         }else{
1128  /*              No match found...   */
1129             if(t->n_aggrs == t->max_aggrs) {
1130  /*              And the aggregate list is full. Reclaim from the end    */
1131                 if(prev_aggr != NULL)
1132                     curr_aggr = prev_aggr->next;
1133                 else    curr_aggr = t->aggr_head;
1134                 if(prev_aggr != NULL)
1135                     prev_aggr->next = curr_aggr->next;
1136                 if(t->aggr_head != curr_aggr) curr_aggr->next=
1137  t->aggr_head;
```

FIG. 11C (continued)

```
1138                    t->aggr_head = curr_aggr;
1139
1140    /*           Create an output tuple for the aggregate being kicked out    */
1141                    tuple_size = sizeof( struct count_pkts_tuple);
1142                    tuple = allocate_tuple(f,t->f.stream_id, tuple_size );
1143                    if( tuple != NULL) {
1144                            tuple_pos = sizeof( struct count_pkts_tuple);
1145                            tuple->tuple_var0 = curr_aggr->gb_var0;
1146                            tuple->tuple_var1 = curr_aggr->gb_var1;
1147                            tuple->tuple_var2 = curr_aggr->aggr_var0;
1148                            tuple->tuple_var3 = curr_aggr->aggr_var1;
1149                            tuple->tuple_var4 = curr_aggr->aggr_var2;
1150                            tuple->tuple_var5 = curr_aggr->aggr_var3;
1151                            post_tuple(tuple);
1152                    }
1153             }else{
1154    /*           Room in the aggregate list, add another block.     */
1155                    curr_aggr = (struct count_pkts_aggr_struct *)
1156   fta_alloc(f,sizeof(struct count_pkts_aggr_struct) );
1157                    if(curr_aggr == NULL) return(0);
1158                    curr_aggr->next = t->aggr_head;
1159                    t->aggr_head = curr_aggr;
1160                    t->n_aggrs++;
1161             }
1162
1163         curr_aggr->gb_var0 = gb_attr_0;
1164         curr_aggr->gb_var1 = gb_attr_1;
1165         curr_aggr->aggr_var0 = 1;
1166         curr_aggr->aggr_var1 = unpack_var_offset_3;
1167         curr_aggr->aggr_var2 = unpack_var_ttl_3;
1168         curr_aggr->aggr_var3 = unpack_var_destIP_3;
1169     }
1170
1171     return 0;
1172 }
```

FIG. 11D

```
1101  struct FTA * count_pkts_fta_alloc(unsigned stream_id, unsigned priority, int
1102  argvc, void * argv[] ) {
1103          struct count_pkts_fta* f;
1104
1105          if( (f=fta_alloc(0,sizeof(struct count_pkts_fta) ) )==0) {
1106                  return(0);
1107          }
1108          f->aggr_head = NULL;
1109          f->n_aggrs = 0;
1110          f->max_aggrs = 1;
1111
1112          f->f.stream_id=stream_id;
1113          f->f.priority=priority;
1114          f->f.alloc_fta=count_pkts_fta_alloc;
1115          f->f.free_fta=free_fta;
1116          f->f.control_fta=control_fta;
1117          f->f.accept_packet=accept_packet;
1118
1119          return (struct FTA *) f;
1120  }
```

FIG. 12

```
1201  DEFINE {
1202    fta_name 'test_query';
1203  }
1204
1205  select hdr_length, max( str_find_substr(IPv4_header, 'bob') ),
1206              str_find_substr( min(IPv4_header) ,'bob')
1207  from IPV4 p
1208  where precedence > 5 and IPv4_header >
1209              str_find_substr(IPv4_data, 'host:*\n')
1210  group by hdr_length
```

FIG. 13

```
1301  DEFINE {
1302    fta_name 'count_pkts';
1303    min_hdr_length 'int';
1304  }
1305
1306  select timestamp, hdr_length
1307  from IPV4 p
1308  where hdr_length > $min_hdr_length
```

FIG. 14A

```
1401  #include "rts.h"
1402  #include "fta.h"
1403
1404
1405
1406  /*      The FTA references the following internal fcns:
1407  */
1408
1409  struct count_pkts_fta {
1410      struct FTA f;
1411      int param_min_hdr_length;
1412  } ;
1413
1414  struct count_pkts_tuple {
1415      unsigned long long int  tuple_var0;
1416      unsigned int  tuple_var1;
1417  } ;
1418
1419  static void load_params(struct count_pkts_fta *t, int sz, void *value) {
1420      int pos=0;
1421      int data_pos;
1422
1423      data_pos = sizeof( int );
1424      if(data_pos > sz) return;
1425
1426      t->param_min_hdr_length = *( (int *) ( (char *)value+pos) );
1427      pos += sizeof( int );
1428  }
1429
1430  static int free_fta(struct FTA *f) {
1431      return 0;
1432  }
1433
```

FIG. 14A (continued)

```
1134  static int control_fta(struct FTA *f, int command, int sz, void *value) {
1135      struct count_pkts_fta * t = (struct count_pkts_fta *) f;
1136
1137      if(command == FTA_COMMAND_LOAD_PARAMS) {
1138          load_params(t, sz, value);
1139      }
1140      return 0;
1141  }
1142
1143  static int accept_packet(struct FTA *f, struct packet *p) {
1144  /*          Variables which are always needed    */
1145      int retval, tuple_size, tuple_pos;
1146      struct count_pkts_tuple *tuple;
1147      struct count_pkts_fta *t = (struct count_pkts_fta*) f;
1148
1149  /*          Variables for unpacking attributes    */
1150      unsigned int  unpack_var_hdr_length_3;
1151      unsigned long long int  unpack_var_timestamp_3;
1152
1153
1154  /*          Unpack the referenced fields    */
1155      retval = get_ipv4_hdr_length_(p, &unpack_var_hdr_length_3);
1156      if(retval) return 0;
1157      retval = get_timestamp(p, &unpack_var_timestamp_3);
1158      if(retval) return 0;
1159
```

FIG. 14B

```
1401  /*          Test the predicate    */
1402       if( !( ( unpack_var_hdr_length_3>t->param_min_hdr_length ) ) )
1403            return 0;
1404
1405  /*          Create and post the tuple    */
1406       tuple_size = sizeof( struct count_pkts_tuple);
1407       tuple = allocate_tuple(f,t->f.stream_id, tuple_size );
1408       if( tuple == NULL)
1409            return 0;
1410       tuple_pos = sizeof( struct count_pkts_tuple);
1411       tuple->tuple_var0 = unpack_var_timestamp_3;
1412       tuple->tuple_var1 = unpack_var_hdr_length_3;
1413       post_tuple(tuple);
1414
1415       return 0;
1416  }
1417
1418  struct FTA * count_pkts_fta_alloc(unsigned stream_id, unsigned priority, int
1419  command, int sz, void *value) {
1420       struct count_pkts_fta* f;
1421
1422       if( (f=fta_alloc(0,sizeof(struct count_pkts_fta) ) )==0) {
1423            return(0);
1424       }
1425
1426       f->f.stream_id=stream_id;
1427       f->f.priority=priority;
1428       f->f.alloc_fta=count_pkts_fta_alloc;
1429       f->f.free_fta=free_fta;
1430       f->f.control_fta=control_fta;
1431       f->f.accept_packet=accept_packet;
1432
1433       load_params(f, sz, value);
1434
1435       return (struct FTA *) f;
1436  }
```

METHOD AND APPARATUS FOR PACKET ANALYSIS IN A NETWORK

COPYRIGHT STATEMENT

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present invention relates generally to communication networks and, more particularly, to monitoring communication networks.

The providers and maintainers of data network services need to be able to collect detailed statistics about the performance of the network. These statistics are used to detect and debug performance problems, provide performance information to customers, help trace network intrusions, determine network policy, and so on. A number of network tools have been developed to perform this task. For example, one approach is to use a "packet sniffer" program such as "tcpdump" that extracts packets from the network, formats them, and passes them to a user-level program for analysis. While this approach is very flexible, it is also very slow—requiring extensive processing for each packet and numerous costly memory transfers. Moreover, moderately priced hardware, such as off-the-shelf personal computer hardware, cannot keep pace with the needs of high-speed networks, for example such as the emerging Gigabit Ethernet standard.

Another approach is to load a special-purpose program into the network interface card (NIC) of a network monitoring device. Processing such as filtering, transformation and aggregation (FTA) of network traffic information can be performed inside the NIC. This approach is fast—but inflexible. As typically implemented in the prior art, the programs are hard-wired to perform specific types of processing and are difficult to change. Network operators typically require a very long lead time as well as interaction with the NIC manufacturer in order to change the program to perform a new type of network analysis.

SUMMARY OF THE INVENTION

A method and system for monitoring traffic in a data communication network and for extracting useful statistics and information is disclosed. In accordance with an embodiment of the invention, a network interface card has a run-time system and one or more processing blocks executing on the network interface. The run-time system module feeds information derived from a network packet to the processing modules which process the information and generate output such as condensed statistics about the packets traveling through the network. The run-time system module manages the processing modules and passes the output to a host. The run-time system and the processing modules interact using a small well-defined application program interface provided for that purpose. The network monitor can be configured with the run-time system and an arbitrary collection of processing blocks, which use the application program interface and which fit into memory and timing constraints. In accordance with an aspect of the invention, the processing performed by the processing modules can be specified in a high-level language that is readily translated into a form used with the run-time system to create a new executable that is loaded into the network interface card. The processing modules can be instantiated as processing templates that are selected for execution and passed parameters without a need for generating a new executable. Alternatively, the run-time system can be enhanced to include facilities for loading and dynamically linking new processing modules on-the-fly. The processing modules thereby can be readily removed, changed, and/or replaced without replacing the run-time system module.

The present invention thereby permits a network monitor to be easily modified as needed to manage the network infrastructure. These and other advantages of the invention will be apparent to those of ordinary skill in the art by reference to the following detailed description and the accompanying drawings.

BRIEF DESCRIPTION OF THE DRAWINGS

FIGS. 3, 6, and 9 set forth test queries for processing a packet, specified in a high level language.

FIGS. 4, 7, and 10 set forth flowcharts of processing performed by an FTA block, illustrating an embodiment of an aspect of the invention, and corresponding to the test queries set forth in FIGS. 3, 6, and 9 respectively.

FIGS. 5, 8, and 11 set forth the test queries set forth in FIGS. 3, 6, and 9 respectively as translated into a low-level language for processing a packet.

FIGS. 11 and 12 set forth test queries for processing a packet, specified in a high language.

FIG. 13 sets forth the test query set forth in FIG. 12 as translated into a low-level language for processing a packet.

FIG. 14A sets forth internal functions referenced by an FTA block.

FIG. 14B sets forth testing code for an FTA block.

DETAILED DESCRIPTION OF THE INVENTION

Figure 1:
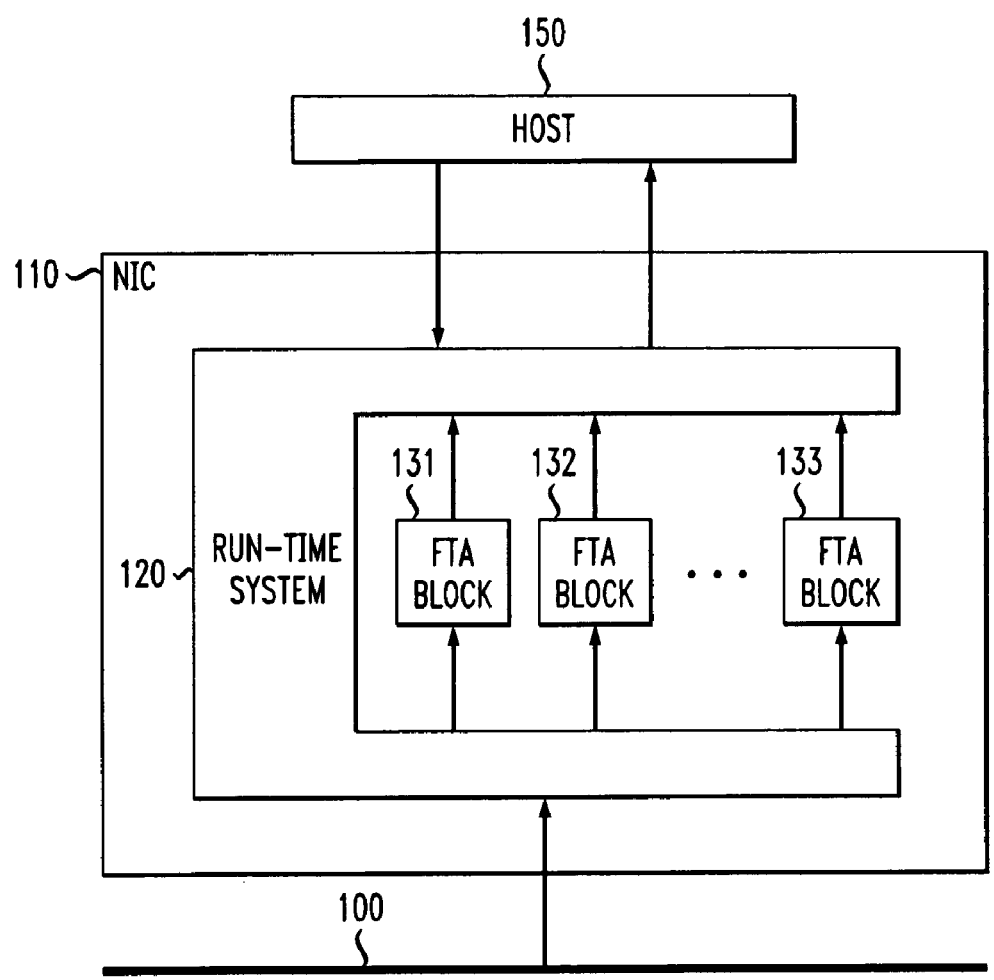
FIG. 1 shows a block diagram of a network monitoring system illustrating various aspects of the present invention.

FIG. 1 shows a block diagram of a network monitoring system illustrating various aspects of the present invention. A network interface card (NIC) 110 provides an interface between a data communication network and a host computer 150. The NIC 110 interfaces to the data network at 100. The NIC 110, as is well known in the art, can comprise one or more on-board processors, hardware interfaces to the appropriate network and host, and memory which can be used to buffer data received from the data network and for storing program instructions for off-loading data processing tasks from the host. For example, and without limitation, the NIC 110 can be a programmable Gigabit Ethernet PCI local bus adaptor manufactured by vendors such as 3Com Corporation. The host computer 150 as is well known in the art can include any device or machine capable of accepting data, applying prescribed processes to the data, and supplying the results of the processes: for example and without limitation a digital personal computer having an appropriate interface for the NIC, e.g. a PCI local bus slot. The present invention is not limited to any particular host or NIC architecture; nor is it limited to any particular communication network protocol such as Ethernet.

The software design of the NIC is represented abstractly in FIG. 1 as separate modules 120, 131,132,133, in accordance with a preferred embodiment of an aspect of the invention. The run-time system 120 is a flexible program that is loaded into the memory of the NIC 110 and executed on the on-board processor. The run-time system 120, in addition to performing tasks such as scheduling and resource management, handles interactions between the network 100, the host computer 150, and one or more processing blocks referred to by the inventors as "FTA processing blocks" or "FTA blocks", depicted in FIG. 1 as 131, 132, and 133. The run-time system 120 provides an environment for the execution of the FTA blocks 131 . . . 133. The FTA blocks 131 . . . 133 are program instructions that are loaded into the memory of the NIC 110 and executed on the same or a different on-board processor ("FTA" stands for filter, transform, and aggregate, although the processing capable of being performed by an FTA block is not so limited). FTA blocks 131 . . . 133, as further described herein, are preferably written in a higher-level language and compiled for use with the run-time system 120. Data such as packets traveling through the communication network are captured by the run-time system 120 and fed to the FTA blocks 131 . . . 133 residing on the NIC 110. The FTA blocks 131 . . . 133 process the packets and create output which is, in one embodiment, a condensed representation of the packets provided to the FTA. The output is gathered by the run-time system 120 and relayed to the host 150.

Figure 2:
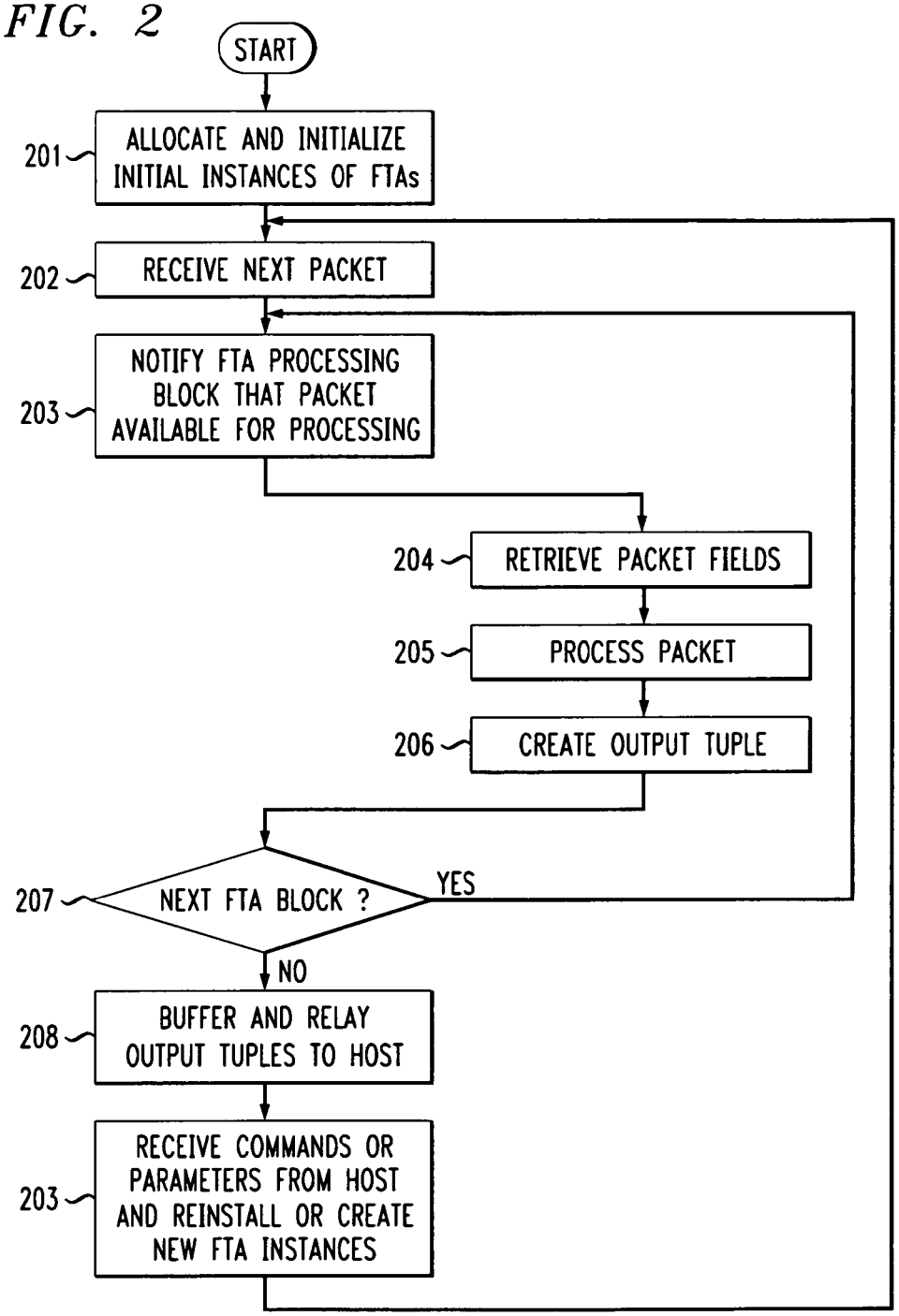
FIG. 2 sets forth a flowchart of processing performed by a run-time system and FTA blocks, illustrating a preferred embodiment of an aspect of the invention.

For example, FIG. 2 sets forth a flowchart of processing performed by the run-time system 120 and the FTA blocs 131 . . . 133. At step 201, the run-time system 120 allocates and initializes the various instances of the FTA blocks 131 . . . 133. It is advantageous to provide dynamic memory allocation for the FTA blocks, for example so that they can store state, as well as provide for dynamic installation of new FTA blocks. At step 202, the run-time system 120 receives a packet and performs some initial processing of the packet, such as parsing the fields of the packet, perhaps doing some basic translation, and storing the fields in an appropriate data schema. At step 203, the run-time system 120 begins notifying the FTA blocks 131 . . . 133 that a packet has arrived and is ready for processing. An ordered list of FTA blocks can be utilized to determine the processing order. It is advantageous to also prioritize the FTA processing with priority levels so that FTA blocks with a lower priority level than the current resource priority level, as ascertained by the run-time system 120, can have its resources removed and reallocated once more resources are available.

The FTA blocks 131 . . . 133, in turn, receive notification from the run-time system 120 and perform processing in accordance with steps 204, 205, and 206 in FIG. 2. At step 204, the first FTA block in the ordered list retrieves only the fields in in the packet that it needs for processing. At step 205, the FTA block then proceeds to process the information in the selected fields, for example by testing predicates and recalculating aggregates. Within resource constraints, the FTA block can perform arbitrary computations. At step 206, the FTA block optionally stores the results of the processing in a named data buffer, which the inventors refer to herein as a data "tuple." It is usually advantageous for the FTA block to process additional input tuples before producing an output tuple. The FTA block then informs the run-time system 120 that it has completed its processing by returning a value. At step 207, the run-time system 120 notifies the next FTA block to commence processing, and so on, until all of the FTA blocks of the appropriate priority level have completed their respective processing tasks (it may also be useful to provide a "hook" enabling an FTA block to "short-circuit" the remaining processing on the packet, e.g. by returning a special value to the run-time system 120).

At step 208, the run-time system 120 can transfer the data tuples up to the host 150, for example on a regular basis or when the tuple buffers have filled up. Notably, the run-time system need not know anything about the format of the data, which can be private between the particular FTA block that generates the data and the host. The run-time system 120 can also generate a system-related data tuple to inform the host 150 of system events, such as a priority-based suspension of an FTA block. At step 209, the run-time system can receive and respond to commands from the host 150, for example by removing FTA blocks, installing new FTA blocks, passing parameters to existing FTA blocks, etc.

It is advantageous for the FTA blocks 131 . . . 133, as well as the host 150, to interact with the run-time system 120 using a small application program interface (API). The following is an example of such an API. The run time system interacts with the FTA block by calling FTA block procedures, e.g. procedures called at FTA block construction and destruction time and also at other exceptional events such as flush requests, monitoring requests, notification of new operating parameters, and so on. An FTA processing block, with associated functions, can be defined as follows in the C programming language:

```
struct FTA {
    unsigned stream_id; /* id of stream contributes to */
    unsigned priority; /* priority of FTA */
    /* allocate and initialize parameterized instance of FTA */
    struct FTA * (*alloc_fta) (unsigned stream_id, unsigned priority,
        int argvc, void *argv[]);
    /* release all resources associated with FTA */
    int (*free_fta) (struct FTA *);
    /* send control data from host to intance of FTA */
    int (*control_fta) (struct FTA *, int argvc, void *argv[]);
    /* process packet received on interface */
    int (*accept_packet) (struct FTA *, struct packet *)
}
```

The "accept_packet" function notifies the FTA block that a new packet is available for processing and, thus, includes programming instructions for the FTA block's processing as defined by the particular user.

The run-time system, on the other hand, provides access to various procedures that an FTA block can call. It is advantageous to provide general utility functions for the FTA blocks such as functions for string manipulation, prefix matching, memory allocation, etc., so that the only library functions that an FTA block needs to call are already included in the run-time system. Functions can be included to accessing the properties of a packet and for outputting data to the host. For example, the following functions can be defined to permit an FTA to allocate memory for a data tuple and to deliver a data tuple to the host:

```
void * allocate_tuple(struct FTA *, int stream_id, int size);
int post_tuple(void *tuple);
```

Before a tuple can be output, a tuple memory block is allocated in the tuple memory space using the "allocate_tuple" function. The FTA block calls the "post_tuple" procedure to request delivery of the data to the host, it is useful to provide functions for dynamic memory allocation for FTA blocks, e.g. so that they can store state, etc.:

```
void *fta_alloc(struct FTA *, int size);
void fta_free(struct FTA *, void *mem);
void fta_free_all (struct FTA *);
```

Note that it is advantageous for the allocator to keep track of which FTA owns which block so that all allocated blocks for a given FTA can be freed all at once.

Finally, the run-time system responds to commands from the host, e.g. such as functions for receiving data that correspond to the above functions for posting data to the host:

```
int tuple_open(int stream_id);
int tuple_get_buffer(int handle, void *tuple_buffer, int buffer_size);
int tuple_close(int handle);
int tuple_reset_buffer();
```

The "tuple_get_buffer" functions retrieves the information from the network interface card. The "tuple_reset_buffer" function can be used to flush all pending data tuples. Functions ca be provided for installing and removing FTA blocks dynamically:

```
int fta_insert(int adaptor, struct FTA * after, struct FTA * new);
int fta_remove(int adaptor, struct FTA * id);
```

The following call advantageously can be used to create a new parameterized instance of a previously installed FTA block. The FTA template IDs are defined in an include file, and the function call results in a call to the FTA block's "alloc_fta" function:

```
struct FTA *fta_alloc_instance(int adapter, unsigned FTA_templat_ID,
    unsigned stream_id, unsigned priority, int argvc, void * argv[]);
```

Callouts to a corresponding FTA block can be made by a host by the following functions:

```
int fta_free_instance(int adapter, struct FTA *FTA_id);
int fta_control(int adapter, struct FTA *FTA_id, int argvc, void *argvc[])
```

It is also advantageous to define a scratchpad and associated functions in situations where long parameters need to be passed to the FTA blocks.

Figures 3, 4:
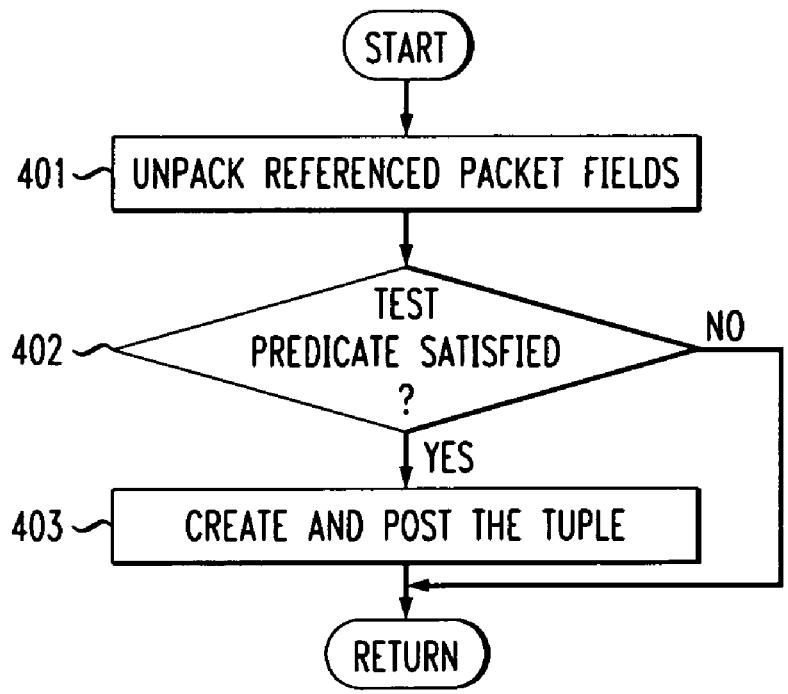

As noted above, the processing performed by an FTA block can be arbitrary. Although the processing of an FTA block can be specified in a low-level programming language like C using the above-specified API directly, it is more advantageous to cast the problem of writing an FTA block as one of writing a query on a relational table where the table corresponds to the stream of packets in the communication network. The query can be written in a language such as SQL or a subset of SQL and automatically transformed or translated into code usable to instantiate the FTA block. This reduces the creation time and allows non-specialists to write FTA blocks. FIGS. 3, 6, and 9 set forth various test queries describing packet processing in a high-level representation.

FIG. 3 sets forth an example query that is used to select and record information on packets that are larger than a specified size. At lines 305–306, the query specifies that the "timestamp" and "hdr_length" field should be retrieved from an IPv4 packet for processing. At line 307, a test predicate is defined for the query which chooses packets which have a "hdr_length" greater than 50. This query can be parsed and utilized to generate processor instructions in a programming language such as the C programming language taking advantage of the API specified above, as set forth in FIGS. 5A and 5B. FIG. 4 sets forth a simplified flowchart of the processing that would be performed by the FTA block with this simple query. Starting at line 528 in FIG. 5A, the "accept_packet" function is defined which specifies the processing to be performed by the FTA block. At lines 539–543, the FTA block retrieves the fields referenced above from the packet using standardized functions for retrieving packet information. This corresponds to step 401 shown in FIG. 4. Then, at lines 546–548, the FTA block determines whether the packet meets the defined test predicate, i.e. whether "hdr_length">50. This corresponds to step 402 shown in FIG. 4. If the packet does not meet the test predicate, it is ignored. If the packet does meet the test predicate, a tuple is created and posted at lines 550–558, corresponding to step 403 in FIG. 4. The data structure of the tuple stores information corresponding to the fields selected in the query.

Figure 7:
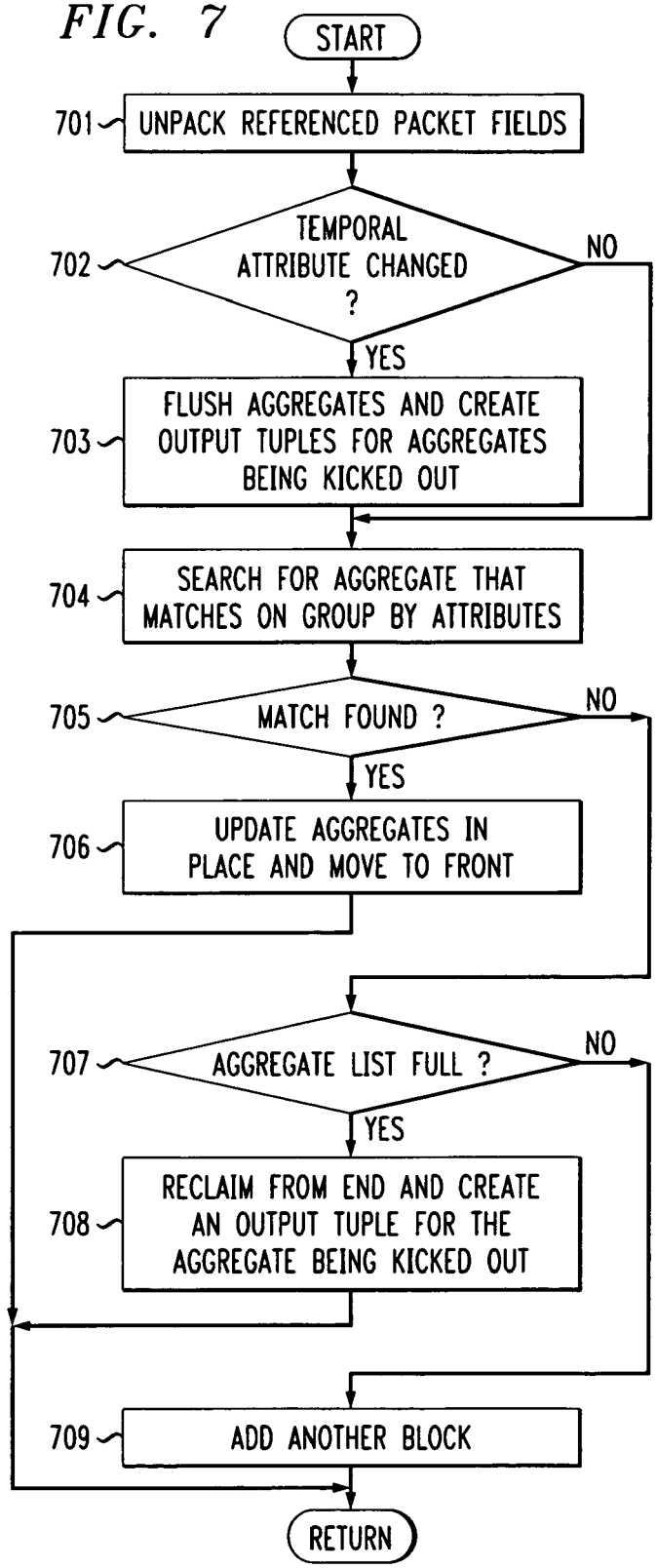

FIG. 6 sets forth another example query that is used to count packets. As set forth in lines 606–608, a "count" of packets is maintained for every 5000 time units, as recorded in the timestamp. The 5000 time units are grouped and defined at line 608 as a "timebucket." The query records the timebucket and the count of packets for the timebucket. The query set forth in FIG. 6 readily translates into the flowchart set forth in FIG. 7 and the programming code set forth in FIGS. 8A, 8B, and 8C. FIG. 7 describes the processing performed by the FTA block, corresponding to the "accept_packet" function defined starting at line 814 in FIG. 8B. At step 701, the referenced packet fields are unpacked, corresponding to line 833–834 in FIG. 8B. The only information about the packet that the FTA block needs to satisfy this query is the timestamp of the packet. There is no test predicate in the query, so the FTA block may then proceed with determining how to process the timestamp information. At step 702, the FTA block determines whether the temporal attribute has changed, namely whether the packet belongs to the current timebucket or a new timebucket (this corresponds to lines 839–844 in FIG. 8B). If the packet belongs to a new timebucket, the FTA block at step 703 proceeds to flush the current aggregate count and create an output tuple(s) for the aggregates that are being kicked out. The FTA block no longer needs this aggregate count since no future packets received can contribute to a past timebucket. Step 703 corresponds to the function "fta_aggr_flush" function defined at lines 838–61 in FIG. 8A. An output tuple is created for the aggregate and posted at lines 847–854. The "fta_free" function, mentioned above, is then utilized at line 856 to flush the current aggregates to make room for the new timebucket. As described above, the run-time system can keep track of which FTA is using which memory and can, in an embodiment, advantageously perform garbage-collecting.

With reference again to FIG. 7, the aggregate count is incremented with the arrival of the new packet and an output tuple produced if aggregate storage space must be reclaimed at steps 704 to step 709. This corresponds to lines 801 to 844 in FIG. 8C. The complexity of the processing performed at this part of the FTA block is useful as more complex type of aggregates are expressed in the query.

Figure 10:
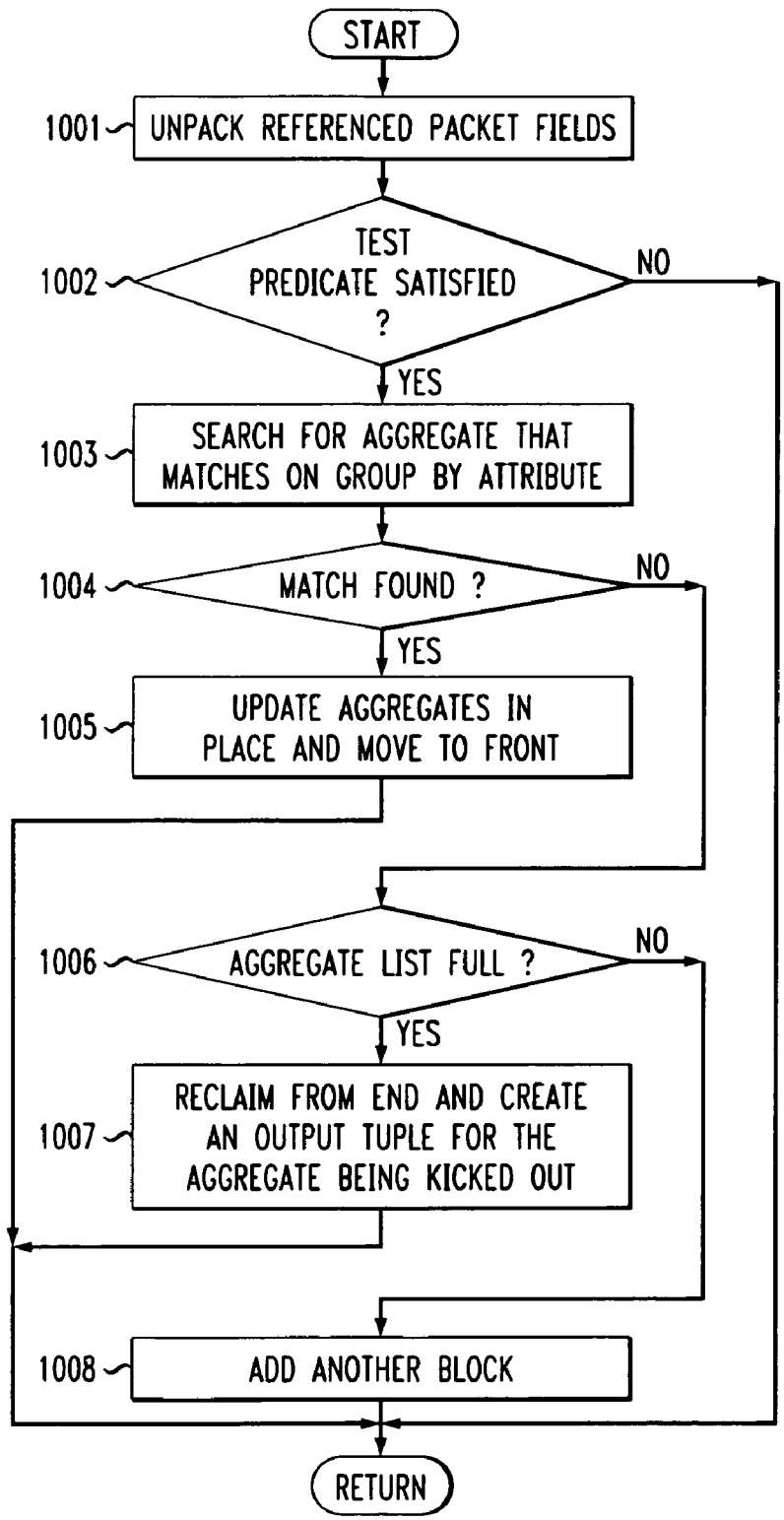

FIG. 9 sets forth a more complicated example query that counts packets that satisfy a certain test predicate. The test predicate is set forth in lines 908 to 910 in FIG. 9. The information to be retrieved from the IPv4 packet, again, are set forth in the "select" statement at lines 905 and 906 in the query. The data is to be aggregated by timestamp and "hdr_length" as specified in line 911. This query readily translates into the flowchart set forth in FIG. 10 and the programming code set forth in FIGS. 11A, 11B, 11C, and 11D. FIG. 10 again describes the processing performed by the FTA block, corresponding to the "accept_packet" function defined starting at line 1117 in FIG. 11B. At step 1001, the referenced packet fields are unpacked, corresponding to lines 1138–1148 in FIG. 11B. At step 1002, the FTA block performs packet filtering by determining whether the test predicate is satisfied, corresponding to lines 1150–1156 in FIG. 11B. As specified in the query, packets are chosen based on the TTL field and the timestamp. If the test predicate is not satisfied, then it is ignored. If it is satisfied, the information retrieved from the packet is utilized in the computation of the aggregates at steps 1003–1008 in FIG. 10. At step 1003, the FTA block searches for an aggregate that matches on the group by attributes. This corresponds to lines 1101–1112 in FIG. 11C. If a match is found, at step 1004, then the aggregate is updated in place and moved to the front. This corresponds to lines 1115–1126 in FIG. 11C. If a match is not found, and there is room in the aggregate list, at step 1006, then another aggregate block is added to the aggregate list, at step 1008 in FIG. 10. This corresponds to lines 1154–1160 in FIG. 11C. If there is no room in the aggregate list, then, at step 1007, space is reclaimed from the end of the list and an output tuple is created for the aggregate being kicked out. This corresponds to lines 1130–1151 in FIG. 11C. Thus, the FTA block can compute the aggregates specified in the query, even given the limited memory resources of a typical network interface card.

FIG. 12 sets forth an example query that illustrates how the system can allow the queries to make calls to certain functions defined in the run-time system. The function "str_find_substr" finds substrings and can be included in the run-time system. An include file can be defined that contains the prototypes of all functions that a query can access. The information to be retrieved from the IPv4 packet are set forth in the "select" statement at lines 1205–1206 in the query. The test predicate is set forth in lines 1208–1209, which utilizes the "str_find_substr" function. If the indicated substring, "host:*\n", cannot be found, it is the equivalent of an attribute that cannot be retrieved, i.e. the query discards the tuple. The query, at lines 1210, also aggregates the results by "hdr_length" as further described above.

FIG. 13 sets forth another example query that illustrates how parameters may be passed to a FTA block. FIG. 13 sets forth a simple query that accepts parameters. FIGS. 14A and 14B set forth the generated C code that corresponds to the query in FIG. 13. The parameter, as set forth in line 1303 in FIG. 13, is "min_hdr_length" which is defined in the "DEFINE" statement as an integer value. The DEFINE statement may be used to define the type of the parameter. In the query, at line 1308, the parameter is referenced in the test predicate by "$min_hdr_length". In the generated programming code, the parameter reference is translated into a reference set forth as "param_min_hdr_length" at line 1402 in FIG. 14B. The "load_params" function, defined at lines 1419–1428 in FIG. 14A, accepts new parameter values for "param_min_hdr_length" and whatever other parameters are defined in the query. Thus, the same FTA block advantageously may be utilized and reused, with different parameters passed to the FTA block.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

What is claimed is:

1. A method of monitoring traffic in a network comprising the steps of:
   receiving at least one data packet at a network interface, said network interface comprising:
      a) a first module handling communications between the network and a host, and
      b) at least one programmable processing module in communication with said first module; and
   processing information in the at least one data packet using the at least one programmable processing module to generate network information,
   wherein the first module passes parameters to the at least one programmable processing module, thereby changing the processing performed by the at least one programmable processing module.

2. The method of claim 1 wherein the network information can be relayed from the network interface to the host.

3. The method of claim 1 wherein the at least one programmable processing module is generated from a processing query expressed in a high-level language.

4. The method of claim 3 wherein the processing query accesses functions defined in the first module.

5. The method of claim 1 wherein the network information is condensed statistics of network performance.

6. The method of claim 1 wherein the at least one programmable processing module performs filtering on the information in the at least one data packet.

7. The method of claim 1 wherein the at least one programmable processing module performs a transformation on the information in the at least one data packet.

8. The method of claim 1 wherein the at least one programmable processing module performs aggregation on the information in the at least one data packet.

9. The method of claim 1 wherein the first module can instantiate new processing modules dynamically.

10. The method of claim 1 wherein the network is a Gigabit Ethernet network.

11. The method of claim 10 wherein the at least one data packet is an Internet Protocol datagram.

12. An apparatus for monitoring traffic in a network comprising:
   a network interface receiving at least one data packet, said network interface comprising:

(a) a first module handling communications between the network and a host, and (b) at least one programmable processing module in communication with the first module and processing information in the at least one data packet to generate network information, wherein the first module passes parameters to the at least one programmable processing module, thereby changing the processing performed by the at least one programmable processing module.

13. The apparatus of claim 12 wherein the network information can be relayed from the network interface to the host.

14. The apparatus of claim 13 wherein the at least one programmable processing module is generated from a processing query expressed in a high-level language.

15. The apparatus of claim 14 wherein the processing query accesses functions defined in the first module.

16. The apparatus of claim 13 wherein the network information is condensed statistics of network performance.

17. The apparatus of claim 12 wherein the at least one programmable processing module performs filtering on the information in the at least one data packet.

18. The apparatus of claim 12 wherein the at least one programmable processing module performs a transformation on the information in the at least one data packet.

19. The apparatus of claim 12 wherein the at least one programmable processing module performs aggregation on the information in the at least one data packet.

20. The apparatus of claim 12 wherein the first module can instantiate new processing modules dynamically.

21. The apparatus of claim 12 wherein the network is a Gigabit Ethernet network.

22. The apparatus of claim 21 wherein the data packet is an Internet Protocol datagram.

* * * * *